US011862207B2

(12) United States Patent
Chembrolu et al.

(10) Patent No.: US 11,862,207 B2
(45) Date of Patent: *Jan. 2, 2024

(54) MAMR STACK SHAPE OPTIMIZATION FOR MAGNETIC RECORDING

(71) Applicant: Western Digital Technologies, Inc., San Jose, CA (US)

(72) Inventors: Venkatesh H Chembrolu, Fremont, CA (US); Muhammad Asif Bashir, San Jose, CA (US); Petrus Antonius Van Der Heijden, Cupertino, CA (US); Terence T. Lam, Cupertino, CA (US); Yaguang Wei, Pleasanton, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/869,325

(22) Filed: Jul. 20, 2022

(65) Prior Publication Data

US 2022/0358959 A1    Nov. 10, 2022

Related U.S. Application Data

(62) Division of application No. 17/107,637, filed on Nov. 30, 2020, now Pat. No. 11,437,060, which is a
(Continued)

(51) Int. Cl.
*G11B 5/31* (2006.01)
*G11B 5/00* (2006.01)

(52) U.S. Cl.
CPC .......... *G11B 5/3116* (2013.01); *G11B 5/3146* (2013.01); *G11B 2005/0024* (2013.01)

(58) Field of Classification Search
None
See application file for complete search history.

(56) References Cited

U.S. PATENT DOCUMENTS 6,433,973 B1   8/2002  Li et al.
6,636,395 B1   10/2003 Terunuma
(Continued)

FOREIGN PATENT DOCUMENTS

CN      104835510 B    11/2017
JP      2013251042 A   12/2013
(Continued)

OTHER PUBLICATIONS

Tagawa, Ikuya et al.; "Advantage of MAMR Read-Write Performance" IEEE Transactions on Magnetics; vol. 52, Issue 9; May 18, 2016; http://ieeexplore.ieee.org/document/7471502 (3 pages).
(Continued)

*Primary Examiner* — William J Klimowicz
(74) *Attorney, Agent, or Firm* — PATTERSON + SHERIDAN, LLP; Steven H. VerSteeg

(57) ABSTRACT

The present disclosure generally relates to data storage devices, and more specifically, to a magnetic media drive employing a magnetic recording head. The head includes a main pole, a trailing shield, and a MAMR stack including at least one magnetic layer. The magnetic layer has a surface facing the main pole, and the surface has a first side at a media facing surface (MFS) and a second side opposite the first side. The length of the second side is substantially less than the length of the first side. By reducing the length of the second side, the area to be switched at a location recessed from the MFS is reduced as a current flowing from the main pole to the trailing shield or from the trailing shield to the main pole. With the reduced area of the magnetic layer, the overall switch time of the magnetic layer is decreased.

15 Claims, 7 Drawing Sheets

Related U.S. Application Data division of application No. 16/293,481, filed on Mar. 5, 2019, now Pat. No. 10,872,626.

(60) Provisional application No. 62/639,350, filed on Mar. 6, 2018.

(56) References Cited

U.S. PATENT DOCUMENTS

| | | | |
|---|---|---|---|
| 8,547,661 | B2 | 10/2013 | Bai |
| 8,582,240 | B1 | 11/2013 | Chen et al. |
| 8,582,247 | B2 | 11/2013 | Song et al. |
| 8,614,861 | B1 | 12/2013 | Tomoda et al. |
| 8,705,206 | B1 | 4/2014 | Maeda et al. |
| 8,724,260 | B2 | 5/2014 | Igarashi et al. |
| 8,908,330 | B1 | 12/2014 | Mallary |
| 9,001,465 | B1 | 4/2015 | Shimizu et al. |
| 9,202,484 | B1 | 12/2015 | Watanabe et al. |
| 9,230,571 | B1 | 1/2016 | Chen et al. |
| 9,275,672 | B2 | 3/2016 | Shiroishi et al. |
| 9,368,135 | B2 | 6/2016 | Gao |
| 9,466,319 | B1 * | 10/2016 | Tang ................. G11B 5/3116 |
| 9,691,415 | B2 | 6/2017 | Koui |
| 9,881,637 | B1 | 1/2018 | Wilson et al. |
| 10,121,497 | B1 * | 11/2018 | Takahashi ............. G11B 5/314 |
| 10,186,284 | B2 | 1/2019 | Narita et al. |
| 10,236,021 | B2 | 3/2019 | Narita et al. |
| 10,276,193 | B2 | 4/2019 | Narita et al. |
| 10,325,618 | B1 | 6/2019 | Wu et al. |
| 10,354,681 | B1 | 7/2019 | Chien et al. |
| 10,366,714 | B1 | 7/2019 | Olson et al. |
| 10,872,626 | B2 | 12/2020 | Chembrolu et al. |
| 10,997,988 | B1 * | 5/2021 | Le ........................ G11B 5/1278 |
| 11,437,060 | B2 * | 9/2022 | Chembrolu ........... G11B 5/3116 |
| 2007/0035878 | A1 * | 2/2007 | Guthrie ................. G11B 5/315 |
| 2008/0304176 | A1 * | 12/2008 | Takagishi ............ G11B 5/1278 |
| 2009/0059423 | A1 | 3/2009 | Yamada et al. |
| 2009/0080120 | A1 * | 3/2009 | Funayama ............... G11B 5/02 |
| | | | 360/313 |
| 2009/0310244 | A1 | 12/2009 | Shimazawa et al. |
| 2012/0002331 | A1 | 1/2012 | Oikawa et al. |
| 2012/0127603 | A1 | 5/2012 | Gao et al. |
| 2013/0050865 | A1 * | 2/2013 | Katada ................. G11B 5/1278 |
| | | | 360/75 |
| 2013/0155550 | A1 | 6/2013 | Sasaki et al. |
| 2013/0250456 | A1 * | 9/2013 | Yamada ............... G11B 5/3146 |
| | | | 360/245.3 |
| 2014/0139952 | A1 | 5/2014 | Takeo et al. |
| 2014/0177092 | A1 * | 6/2014 | Katada ................... G11B 5/314 |
| | | | 360/75 |
| 2014/0177100 | A1 | 6/2014 | Sugiyama et al. |
| 2015/0131184 | A1 * | 5/2015 | Nunokawa ............... G11B 5/35 |
| | | | 216/22 |
| 2015/0213816 | A1 | 7/2015 | Okawa et al. |
| 2016/0027455 | A1 | 1/2016 | Kudo et al. |
| 2016/0163340 | A1 * | 6/2016 | Narita ..................... G11B 5/314 |
| | | | 360/125.04 |
| 2016/0314809 | A1 | 10/2016 | Taguchi et al. |
| 2017/0061995 | A1 | 3/2017 | Taguchi et al. |
| 2017/0148474 | A1 * | 5/2017 | Okamura ............... G11B 5/314 |
| 2017/0236537 | A1 | 8/2017 | Murakami et al. |
| 2018/0268848 | A1 | 9/2018 | Narita et al. |
| 2018/0299645 | A1 | 10/2018 | Kuribayashi |
| 2018/0330748 | A1 * | 11/2018 | Liu ....................... G11B 5/3163 |
| 2019/0080471 | A1 | 3/2019 | Tsuda |
| 2019/0088274 | A1 | 3/2019 | Narita et al. |
| 2020/0082845 | A1 | 3/2020 | Suto et al. |
| 2022/0343944 | A1 * | 10/2022 | Song ................... G11B 5/1278 |

FOREIGN PATENT DOCUMENTS

| | | | | |
|---|---|---|---|---|
| JP | 2017045490 A | * | 3/2017 | .......... G11B 5/1278 |
| WO | 2015126326 A1 | | 8/2015 | |

OTHER PUBLICATIONS

Mallary, Mike et al; "Head and Media Challenges for 3 Tb/in2 Microwave-Assisted Magnetic Recording"; IEEE Transactions on Magnetics, vol. 50, No. 7, Jul. 2014 (8 pages).

* cited by examiner

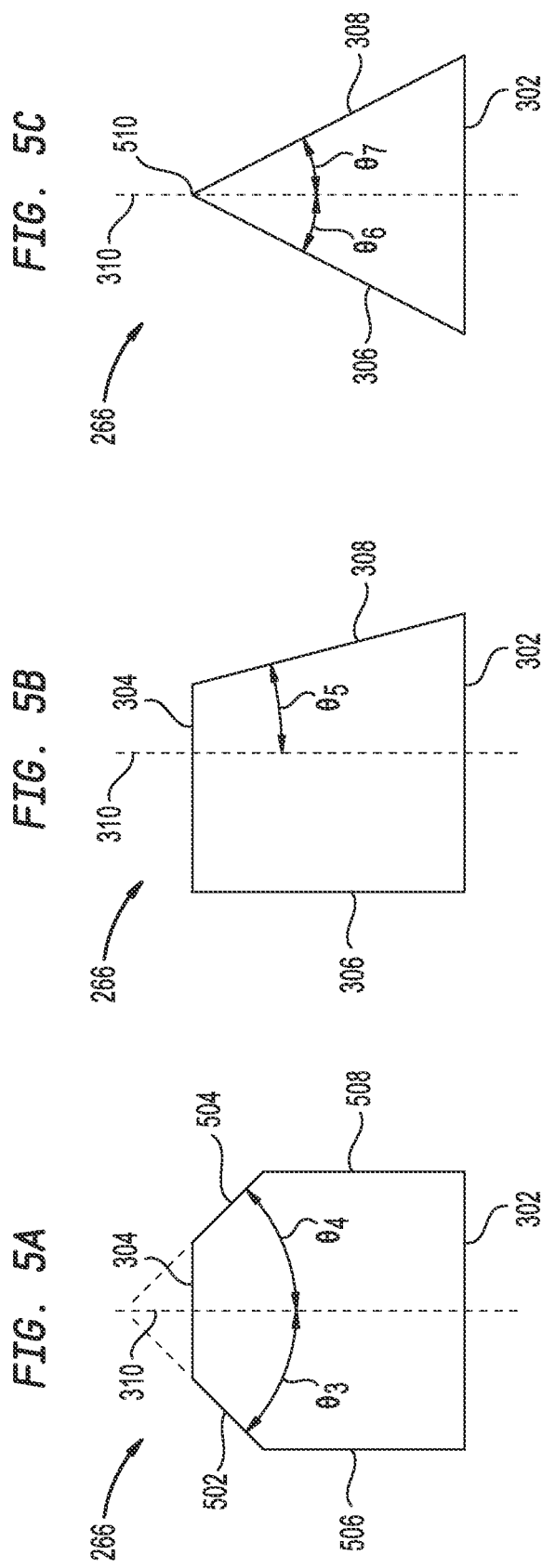
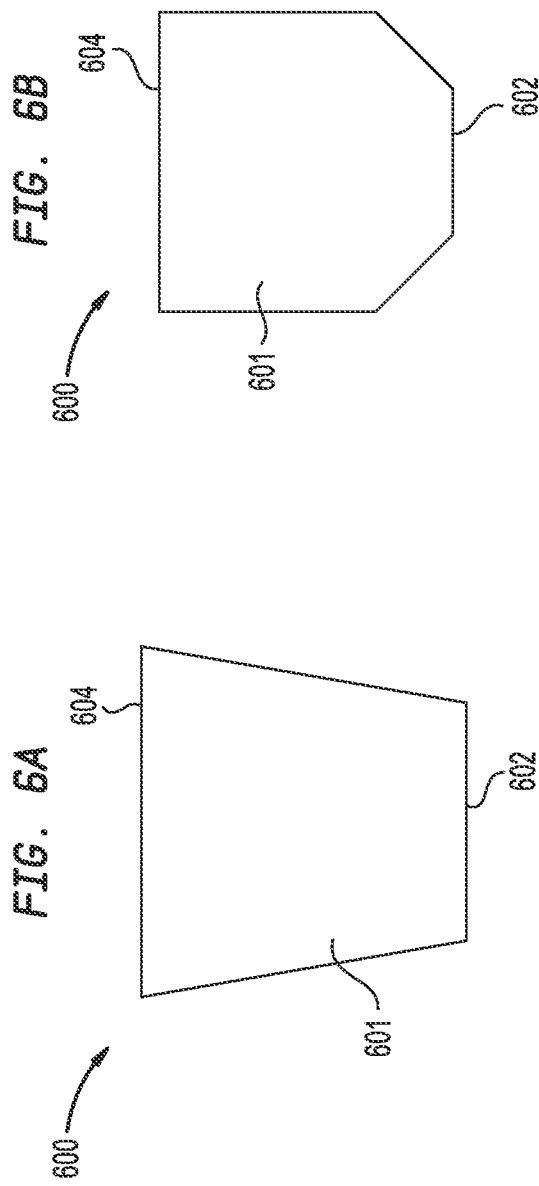

MAMR STACK SHAPE OPTIMIZATION FOR MAGNETIC RECORDING

CROSS-REFERENCE TO RELATED APPLICATIONS

This application is a divisional of U.S. patent application Ser. No. 17/107,637, filed Nov. 30, 2020, which application is a divisional of U.S. patent application Ser. No. 16/293,481, filed Mar. 5, 2019 and now U.S. Pat. No. 10,872,626, which application claims benefit of U.S. Provisional Patent Application Ser. No. 62/639,350, filed Mar. 6, 2018, each of which is herein incorporated by reference.

BACKGROUND

Field of the Disclosure

Embodiments of the present disclosure generally relate to data storage devices, and more specifically, to a magnetic media drive employing a magnetic recording head.

Description of the Related Art

Over the past few years, microwave assisted magnetic recording (MAMR) has been studied as a recording method to improve the areal density of a magnetic read/write device, such as a hard disk drive (HDD). MAMR enabled magnetic recording heads utilize a MAMR stack disposed between the trailing shield and the main pole to improve write field and/or field gradient, leading to better areal density capability (ADC). The MAMR stack includes a magnetic layer, such as a spin torque layer (STL), which is magnetized by a bias current from the main pole to the MAMR stack during operation. The STL switches against the gap field when the bias current through the MAMR stack exceeds a certain threshold. With the STL magnetization pointing in the direction opposite to the gap field, the main pole's field strength and the down track gradient are enhanced, which in turn improves the recording performance.

There is a need in the art for a data storage device that can further improve recording performance.

SUMMARY OF THE DISCLOSURE

The present disclosure generally relates to data storage devices, and more specifically, to a magnetic media drive employing a magnetic recording head. The head includes a main pole, a trailing shield, and a MAMR stack including at least one magnetic layer. The magnetic layer has a surface facing the main pole, and the surface has a first side at a media facing surface (MFS) and a second side opposite the first side. The length of the second side is substantially less than the length of the first side. By reducing the length of the second side, the area to be switched at a location recessed from the MFS is reduced as a current flowing from the main pole to the trailing shield or from the trailing shield to the main pole. With the reduced area of the magnetic layer, the overall switch time of the magnetic layer is decreased.

In one embodiment, a magnetic recording head includes a trailing shield, a main pole, and a stack disposed between the trailing shield and the main pole at a media facing surface. The stack includes at least a layer having a first surface facing the main pole, wherein the first surface has a first side at the media facing surface and a second side opposite the first side, wherein a length of the second side is substantially less than a length of the first side.

In another embodiment, a magnetic recording head includes a trailing shield, a main pole, and a stack disposed between the trailing shield and the main pole at a media facing surface. The stack includes at least a layer having a first surface at the media facing surface and a second surface opposite the first surface, wherein an area of the second surface of the layer is substantially less than an area of the first surface.

In another embodiment, a magnetic recording head includes a trailing shield, a main pole, and a stack disposed between the trailing shield and the main pole at a media facing surface. The stack includes at least a layer having a surface facing the main pole, wherein the surface is substantially asymmetric with respect to a central axis of the surface.

In another embodiment, a magnetic recording head includes a trailing shield, a main pole, and a stack disposed between the trailing shield and the main pole at a media facing surface. The stack includes at least a layer having a surface facing the main pole, wherein the surface has a first side at the media facing surface and a point opposite the first side.

In another embodiment, a magnetic recording head includes a trailing shield, a main pole, and a stack disposed between the trailing shield and the main pole at a media facing surface. The stack includes at least a layer having a surface facing the main pole, wherein the surface has a first side at the media facing surface, a second side opposite the first side, a third side connecting the first side and the second side, and a fourth side opposite the third side, wherein the third side forms a first angle with respect to a central axis of the surface, and the first angle ranges from about greater than zero degrees to about 20 degrees.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 5A-5C are schematic illustrations of the shape of a surface of the magnetic layer of FIG. 3A according to embodiments.

FIGS. 6A and 6B are schematic illustrations of shapes of a surface of a magnetic layer that lead to increased switching time.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The present disclosure generally relates to data storage devices, and more specifically, to a magnetic media drive employing a magnetic recording head. The head includes a main pole, a trailing shield, and a MAMR stack including at least one magnetic layer. The magnetic layer has a surface facing the main pole, and the surface has a first side at a media facing surface (MFS) and a second side opposite the first side. The length of the second side is substantially less than the length of the first side. By reducing the length of the second side, the area to be switched at a location recessed from the MFS is reduced as a current flowing from the main pole to the trailing shield or from the trailing shield to the main pole. With the reduced area of the magnetic layer, the overall switch time of the magnetic layer is decreased.

The terms "over," "under," "between," and "on" as used herein refer to a relative position of one layer with respect to other layers. As such, for example, one layer disposed over or under another layer may be directly in contact with the other layer or may have one or more intervening layers. Moreover, one layer disposed between layers may be directly in contact with the two layers or may have one or more intervening layers. In contrast, a first layer "on" a second layer is in contact with the second layer. Additionally, the relative position of one layer with respect to other layers is provided assuming operations are performed relative to a substrate without consideration of the absolute orientation of the substrate.

Figure 1:
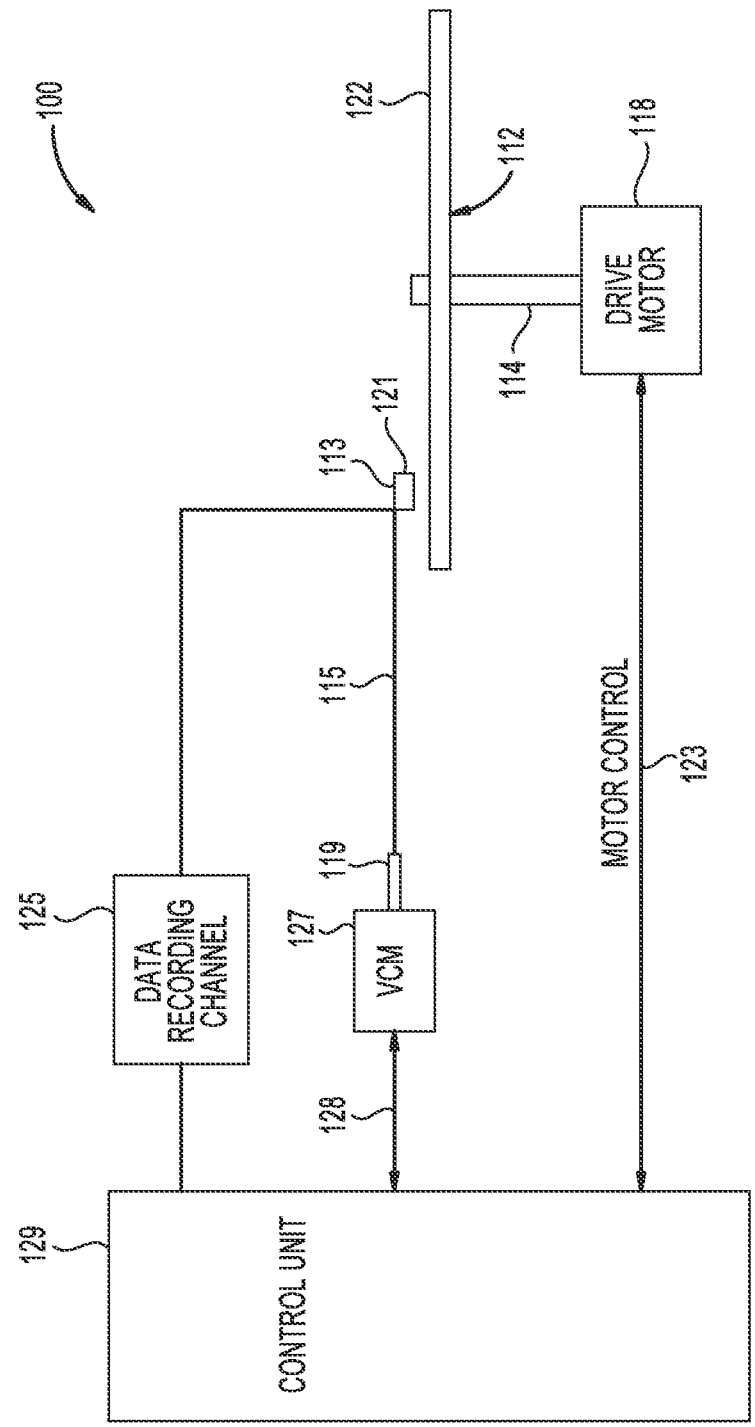
FIG. 1 is a schematic illustration of a magnetic media device according to one embodiment.

FIG. 1 is a schematic illustration of a data storage device such as a magnetic media device. Such a data storage device may be a single drive/device or comprise multiple drives/devices. For the sake of illustration, a single disk drive 100 is shown according to one embodiment. As shown, at least one rotatable magnetic disk 112 is supported on a spindle 114 and rotated by a drive motor 118. The magnetic recording on each magnetic disk 112 is in the form of any suitable patterns of data tracks, such as annular patterns of concentric data tracks (not shown) on the magnetic disk 112.

At least one slider 113 is positioned near the magnetic disk 112, each slider 113 supporting one or more magnetic head assemblies 121 that may include a MAMR stack. As the magnetic disk 112 rotates, the slider 113 moves radially in and out over the disk surface 122 so that the magnetic head assembly 121 may access different tracks of the magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator means 127. The actuator means 127 as shown in FIG. 1 may be a voice coil motor (VCM). The VCM includes a coil movable within a fixed magnetic field, the direction and speed of the coil movements being controlled by the motor current signals supplied by control unit 129.

During operation of the disk drive 100, the rotation of the magnetic disk 112 generates an air bearing between the slider 113 and the disk surface 122 which exerts an upward force or lift on the slider 113. The air bearing thus counterbalances the slight spring force of suspension 115 and supports slider 113 off and slightly above the disk surface 122 by a small, substantially constant spacing during normal operation.

The various components of the disk drive 100 are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads on the assembly 121 by way of recording channel 125.

The above description of a typical magnetic media device and the accompanying illustration of FIG. 1 are for representation purposes only. It should be apparent that magnetic media devices may contain a large number of media, or disks, and actuators, and each actuator may support a number of sliders.

Figure 2A:
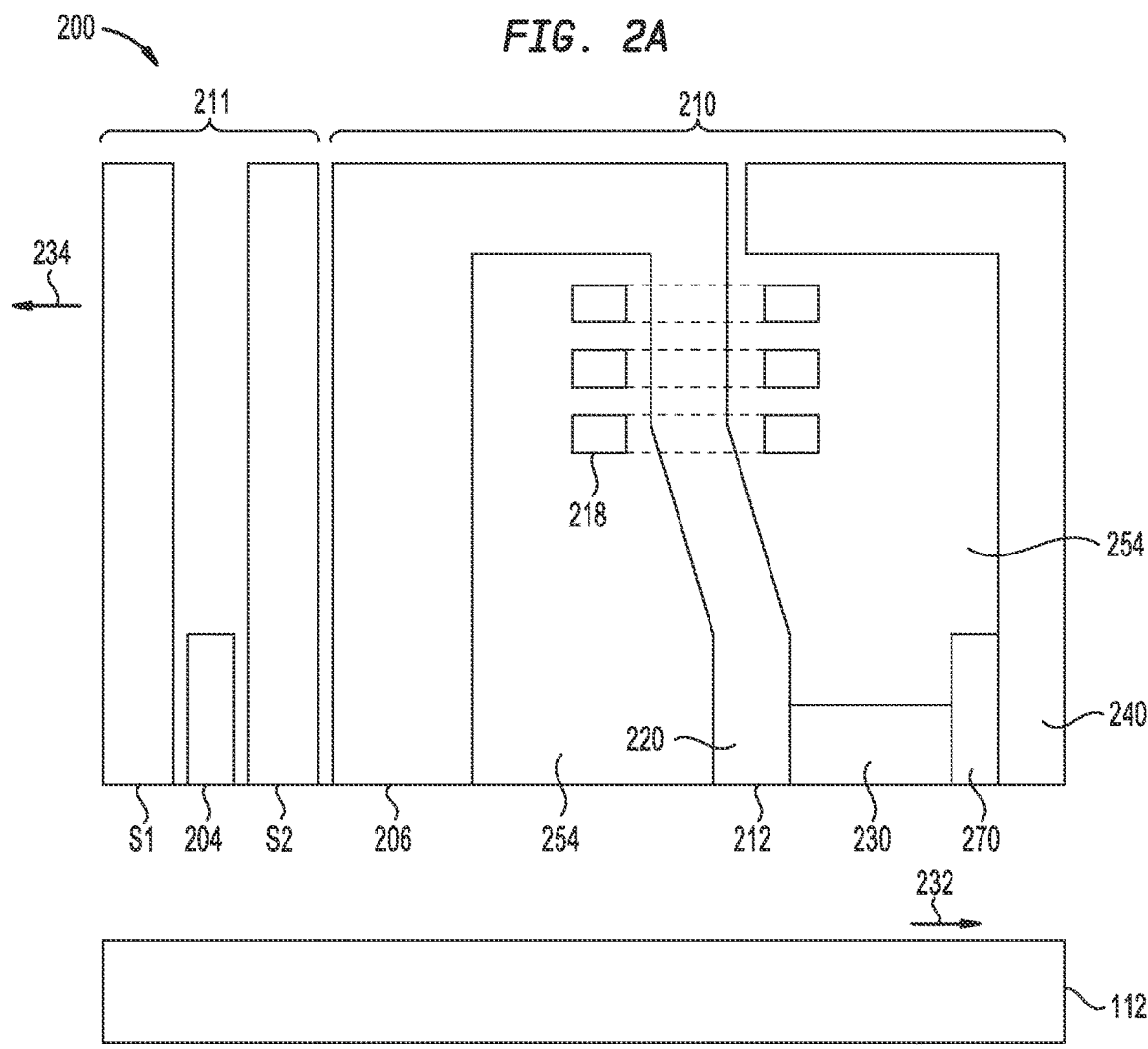
FIG. 2A is a fragmented, cross sectional side view of a read/write head facing a magnetic disk according to one embodiment.

FIG. 2A is a fragmented, cross sectional side view of a read/write head 200 facing the magnetic disk 112 according to one embodiment. The read/write head 200 may correspond to the magnetic head assembly 121 described in FIG. 1. The read/write head 200 includes a MFS 212, such as an air bearing surface (ABS), facing the disk 112, a magnetic write head 210, and a magnetic read head 211. As shown in FIG. 2A, the magnetic disk 112 moves past the write head 210 in the direction indicated by the arrow 232 and the read/write head 200 moves in the direction indicated by the arrow 234.

In some embodiments, the magnetic read head 211 is a magnetoresistive (MR) read head that includes an MR sensing element 204 located between MR shields S1 and S2. In other embodiments, the magnetic read head 211 is a magnetic tunnel junction (MTJ) read head that includes a MTJ sensing device 204 located between MR shields S1 and S2. The magnetic fields of the adjacent magnetized regions in the magnetic disk 112 are detectable by the MR (or MTJ) sensing element 204 as the recorded bits.

The write head 210 includes a main pole 220, a leading shield 206, a trailing shield 240, a coil 218 that excites the main pole 220, and a MAMR stack 230 disposed between the main pole 220 and the trailing shield 240. The main pole 220 may be a magnetic material such as a FeCo or FeCo(N) alloy. The leading shield 206 and the trailing shield 240 may be a magnetic material, such as FeCo or NiFe alloy. The coil 218 may have a "pancake" structure which winds around a back-contact between the main pole 220 and the leading shield 206, instead of a "helical" structure shown in FIG. 2A. The trailing shield 240 includes a notch 270 that is in contact with the MAMR stack 230. The MAMR stack 230 is also in contact with the main pole 220. A dielectric material 254 is disposed between the leading shield 206 and the main pole 220. The dielectric material 254 is also disposed between the main pole 220 and the trailing shield 240 at a location recessed from the MFS 212, as shown in FIG. 2A. The dielectric material 254 is fabricated from any suitable dielectric material, such as aluminum oxide.

Figure 2B:
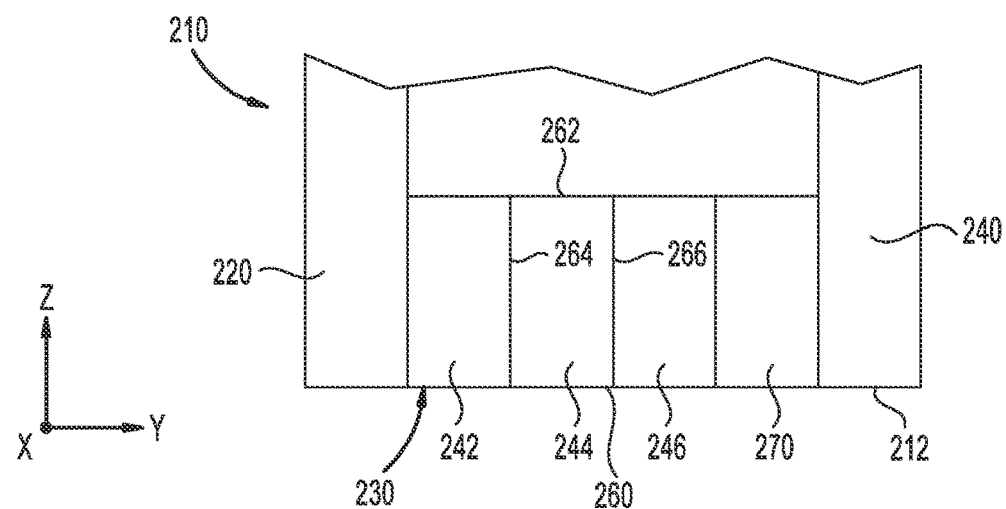
FIG. 2B is a schematic illustration of a portion of the write head of FIG. 2A according to one embodiment.

FIG. 2B is a portion of the write head 210 of FIG. 2A according to one embodiment. As shown in FIG. 2B, the MAMR stack 230 includes a seed layer 242, a magnetic layer 244, and a spacer layer 246. The seed layer 242 is fabricated from an electrically conductive material, such as a non-magnetic metal. In one embodiment, the seed layer 242 is fabricated from Ta, Cr, Cu, NiAl, Ru, Rh, or combination thereof. The magnetic layer 244 is fabricated from a magnetic material, such as NiFe, CoMnGe, CoFe, or combinations thereof. In one embodiment, the magnetic layer 244 is a STL. The spacer layer 246 is fabricated from a material such as copper (Cu) or silver tin alloy (AgSn). During operation, an electrical current having a minimum current density flows into the magnetic layer 244 via the main pole 220 or trailing shield 240, and the magnetic layer 244 switches against the gap field. With the magnetization of the magnetic layer 244 pointing in the direction opposite to the gap field, the field strength of the main pole 220 and the down track gradient are enhanced, which in turn improves the recording performance.

As shown in FIG. 2B, the seed layer 242 is in contact with the main pole 220, the magnetic layer 244 is in contact with the seed layer 242, and the spacer layer 246 is in contact with the magnetic layer 244. The magnetic layer 244 has a first surface 260 at the MFS 212, a second surface 262 opposite the first surface 260, a third surface 264 connecting the first surface 260 and the second surface 262, and a fourth surface 266 opposite the third surface 264. The third surface 264 faces the main pole 220, and the fourth surface 266 faces the trailing shield 240. The definition of the term "face" is extended to include a material located between a first element that is facing a second element and the second element. For example, the third surface 264 of the magnetic layer 244 faces the main pole 220, and the seed layer 242 is located between the main pole 220 and the third surface 264 of the magnetic layer 244. The third surface 264 and the fourth surface 266 both extend from the MFS 212 to a location recessed from the MFS 212 along the Z-axis, and extend in the cross-track direction, as indicated by the X-axis.

Figure 3A:
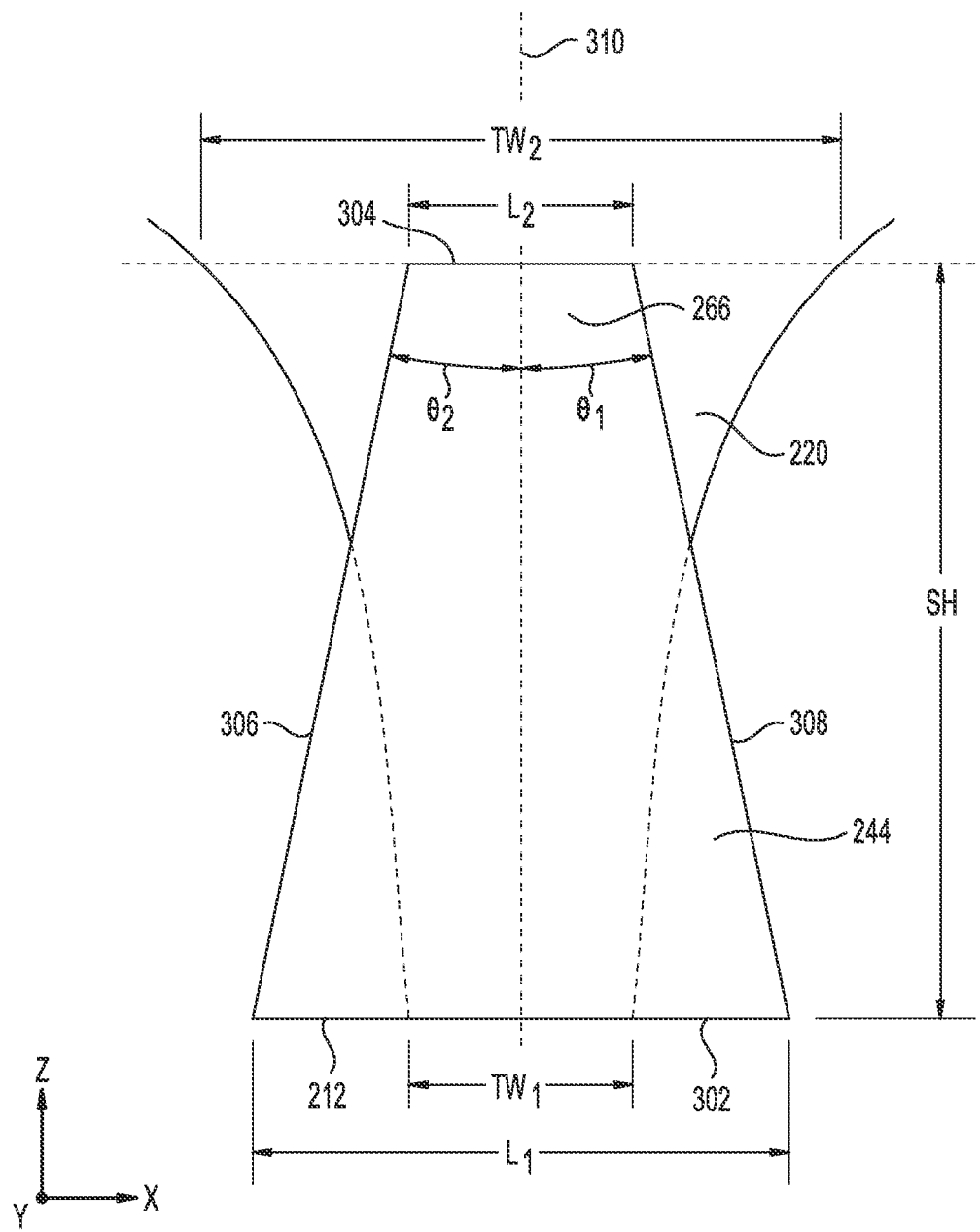
FIG. 3A is a schematic illustration of a magnetic layer disposed over a main pole according to one embodiment.
Figure 3B:
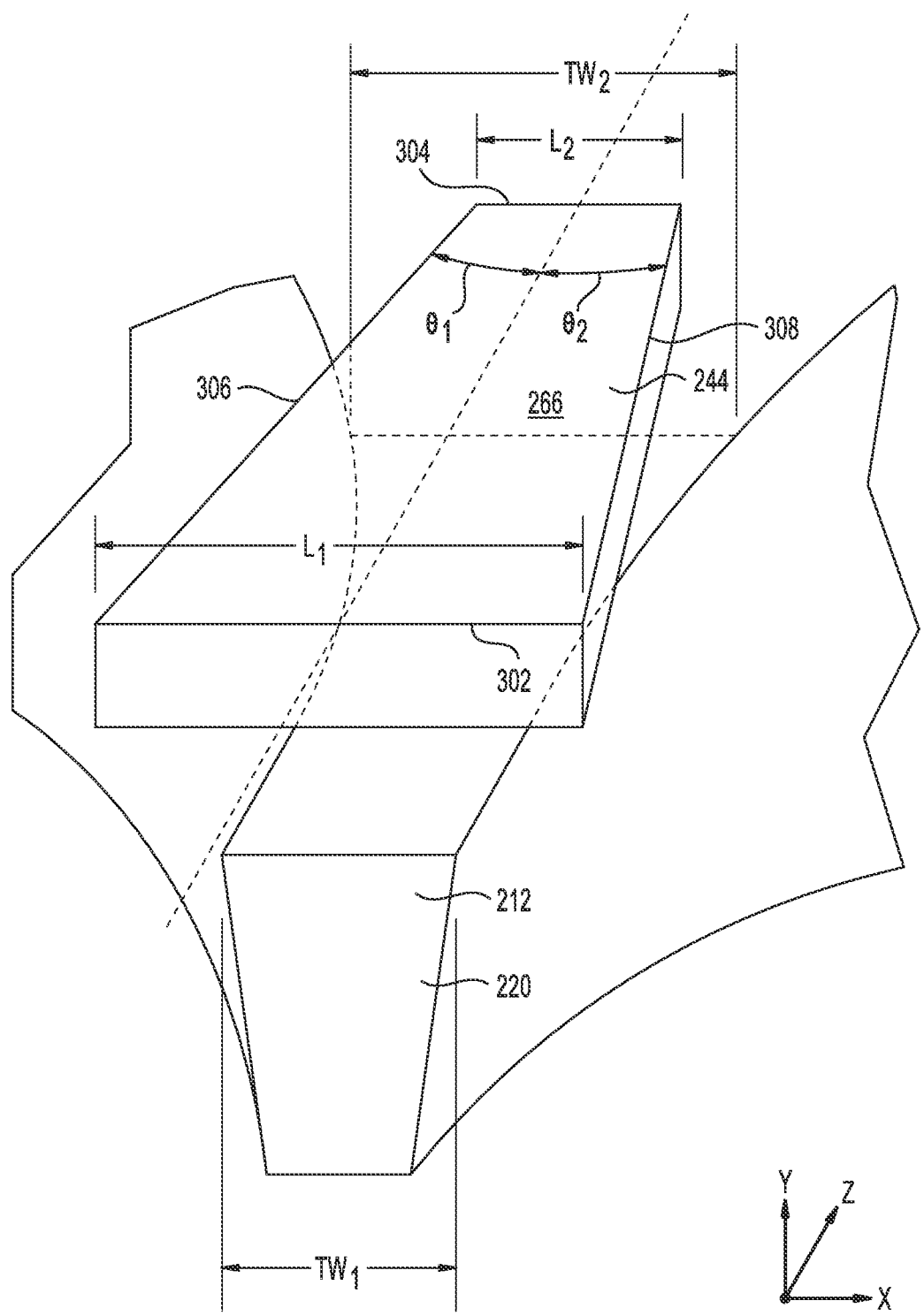
FIG. 3B is a perspective view of the magnetic layer disposed over the main pole according to one embodiment.

FIG. 3A is a schematic top view of the magnetic layer 244 disposed over the main pole 220, and FIG. 3B is a perspective view of the magnetic layer 244 disposed over the main pole 220 according to one embodiment. The seed layer 242 is omitted for better illustration. As shown in FIGS. 3A and 3B, the magnetic layer 244 has a stripe height SH ranging from about 60 nm to about 120 nm along the Z-axis. The magnetic layer 244 includes the surface 266 facing the trailing shield 240 (FIG. 2A). The surface 266 includes a first side 302 at the MFS 212, a second side 304 opposite the first side 302, a third side 306 connecting the first side 302 and the second side 304, and a fourth side 308 opposite the third side 306. The first side 302 and the second side 304 extend in the cross-track direction, as indicated by the X-axis. The first side 302 has a first length $L_1$, and the second side has a second length $L_2$. The second length $L_2$ is substantially less than the first length $L_1$. In one embodiment, the second length $L_2$ is about one percent to about 90 percent of the first length $L_1$. In one embodiment, the surface 266 of the magnetic layer 244 has a trapezoidal shape, such as acute trapezoidal shape, right trapezoidal shape, obtuse trapezoidal shape, or isosceles trapezoidal shape. In one embodiment, the second side 304 is a point, and the surface 266 of the magnetic layer 244 has a triangular shape.

The third side 306 of the surface 266 of the magnetic layer 244 forms an angle $\theta_2$ with respect to a central axis 310 of the surface 266. The fourth side 308 of the surface 266 of the magnetic layer 244 forms an angle $\theta_1$ with respect to the central axis 310 of the surface 266. In one embodiment, the angle $\theta_1$ is substantially the same as the angle $\theta_2$. In another embodiment, the angle $\theta_1$ is substantially different from the angle $\theta_2$. The angle 81 ranges from about zero degrees to about 20 degrees, and the angle $\theta_2$ ranges from about zero degrees to about 20 degrees. The angles $\theta_1$ and $\theta_2$ may not be both zero degrees. In one embodiment, at least one of the angles $\theta_1$ and $\theta_2$ ranges from about greater than zero degrees to about 20 degrees. The surface 266 of the magnetic layer 244 may be substantially symmetric with respect to the central axis 310, as shown in FIG. 3A. In another embodiment, the surface 266 of the magnetic layer 244 may be substantially asymmetric with respect to the central axis 310. The surface 264 of the magnetic layer 244 may have the same shape as the surface 266 and may be substantially parallel to the surface 266.

During operation, there is a higher current density at the location near the second side 304 than at the location near the first side 302 in the magnetic layer 244 as the current flows through the magnetic layer 244 from the main pole 220. The main pole 220 has a first track width $TW_1$ at the MFS 212 and a second track width $TW_2$ at a location that is aligned with the second side 304 of the surface 266 of the magnetic layer 244. The second track width $TW_2$ is substantially greater than the first track width $TW_1$. The first track width $TW_1$ is substantially less than the length $L_1$ of the first side 302 of the surface 266 of the magnetic layer 244. Thus, the current density in the magnetic layer 244 is higher near the second side 304 than the first side 302 due to current crowding. With the higher current density, the portion of the magnetic layer 244 near the second side 304 will switch before the portion of the magnetic layer 244 near the first side 302 switches. As the stripe height SH of the magnetic layer 244 gets greater, for example, greater than 60 nm, the switch time of the magnetic layer 244 is increased. In order to reduce the switch time of the magnetic layer 244, the side 304 of the surface 266 of the magnetic layer 244 is reduced to be substantially less than the side 302 of the surface 266 of the magnetic layer 244. With the reduced side 304, the portion of the magnetic layer 244 near the second side 304 is smaller than the conventional magnetic layer having a cuboid shape. With a smaller portion near the side 304 of the magnetic layer 244, the amount of magnetic material to be switched is reduced, leading to a decreased switching time of the magnetic layer 244.

Figure 4A:
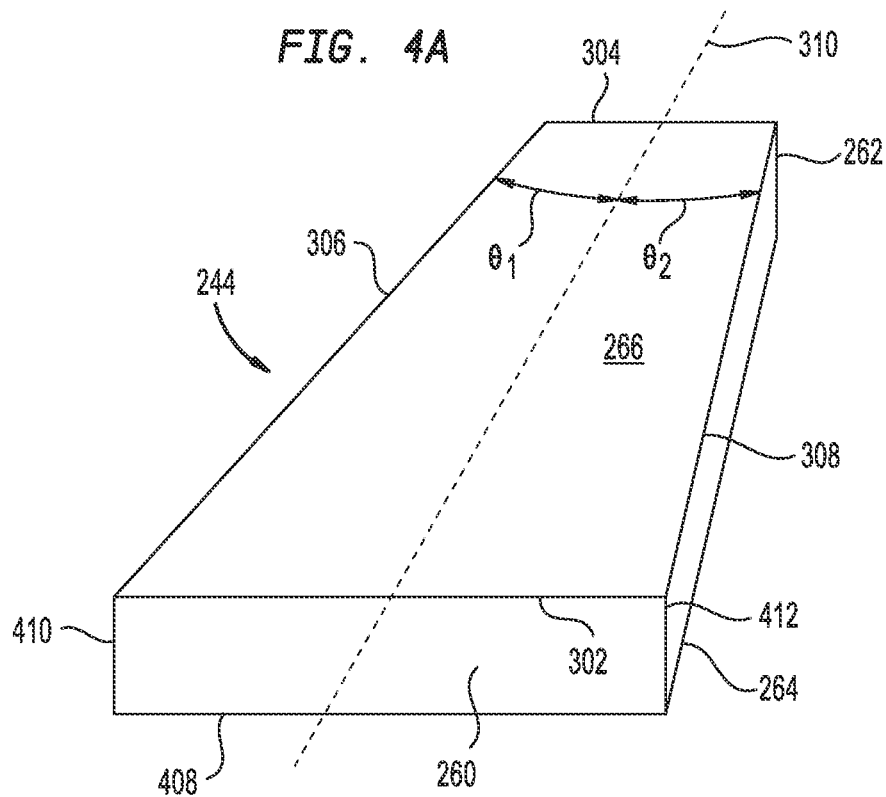
FIG. 4A is a perspective view of the magnetic layer of FIG. 3A according to one embodiment.

FIG. 4A is a perspective view of the magnetic layer 244 of FIG. 3A according to one embodiment. As shown in FIG. 4A, the magnetic layer 244 includes the surface 260 at the MFS 212 (FIG. 2A), the surface 262 opposite the surface 260, the surface 264 facing the main pole 220 (FIG. 2A), and the surface 266 facing the trailing shield 240 (FIG. 2A). The surface 266 includes the side 302 at the MFS 212 (FIG. 2A), the side 304 opposite the side 302, the side 306 connecting the side 302 and side 304, and the side 308 opposite the side 306. The third side 306 forms the angle $\theta_2$ with respect to the central axis 310 of the surface 266, and the fourth side 308 forms the angle $\theta_1$ with respect to the central axis 310. The surface 260 includes the side 302, a side 408 opposite the side 302, a side 410 connecting the side 302 and the side 408, and a side 412 opposite the side 410. The side 302 and the side 408 may be substantially equal in length and substantially parallel. The side 410 and the side 412 may be substantially equal in length and substantially parallel. In one embodiment, as shown in FIG. 4C, the surface 260 has a rectangular shape.

Figure 4B:
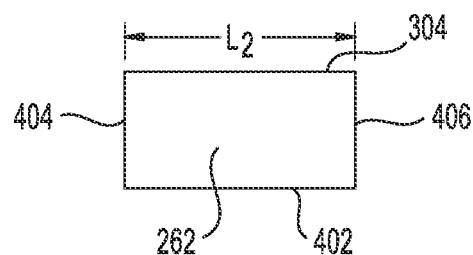
FIGS. 4B and 4C are schematic illustrations of surfaces of the magnetic layer of FIG. 3A according to one embodiment.
Figure 4C:
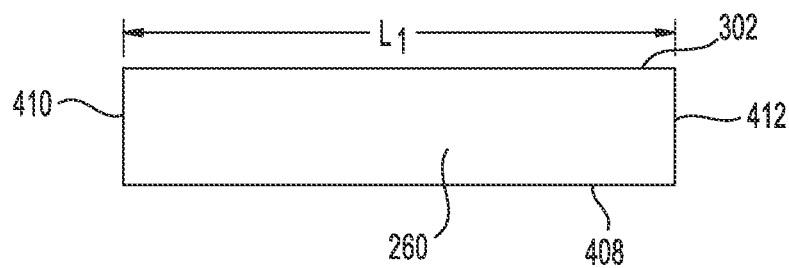

As shown in FIG. 4B, the surface 262 includes the side 304, a side 402 opposite the side 304, a side 404 connecting the side 304 and the side 402, and a side 406 opposite the side 404. The side 304 and the side 402 may be substantially equal in length and substantially parallel. The side 404 and the side 406 may be substantially equal in length and substantially parallel. In one embodiment, as shown in FIG. 4B, the surface 262 has a rectangular shape. The area of the surface 262 is substantially less than the area of the surface 260. With the reduced area of the surface 262, the portion of the magnetic layer 244 near the surface 262 is smaller than the conventional magnetic layer having a cuboid shape. With a smaller portion near the surface 262 of the magnetic layer 244, the amount of magnetic material to be switched is reduced, leading to a decreased switching time of the magnetic layer 244.

FIGS. 5A-5C are schematic illustrations of the shape of the surface 266 (or the surface 264) of the magnetic layer 244 of FIG. 3A according to embodiments. As shown in FIG. 5A, the surface 266 includes the first side 302, the second side 304 opposite the first side, a third side 502 connected to the second side 304, a fourth side 504 opposite the third side 502, a fifth side 506 connected to the third side 502, and a sixth side 508 opposite the fifth side 506. The length of the second side 304 is substantially less than the length of the first side 302. The third side 502 forms an angle $\theta_3$ with respect to the central axis 310 of the surface 266, and the fourth side 504 forms an angle $\theta_4$ with respect to the central axis 310 of the surface 266. The angle $\theta_3$ ranges from about 5 degrees to about 60 degrees, and the angle $\theta_2$ ranges from about 5 degrees to about 60 degrees. As shown in FIG. 5A, the surface 266 is substantially symmetric with respect to the central axis 310. The surface 264 of the magnetic layer 244 may have the same shape as the surface 266 and may be substantially parallel to the surface 266.

FIG. 5B schematically illustrates the surface 266 being substantially asymmetric with respect to the central axis 310. In this embodiment, the central axis 310 extends through the center of the second side 304, but may not extend through the center of the first side 302 since the shape of the surface 266 is asymmetric with respect to the central axis 310. The side 306 is substantially parallel to the central axis 310, and the side 308 forms an angle $\theta_5$ with respect to the central axis 310. The length of the side 304 is substantially less than the length of the side 302, as shown in FIG. 5B. The surface 264 of the magnetic layer 244 may have the same shape as the surface 266 and may be substantially parallel to the surface 266. The surface 266 shown in FIG. 5B has a right trapezoidal shape.

FIG. 5C schematically illustrates the surface 266 having a triangular shape. As shown in FIG. 5C, the surface 266 includes the side 302, a point 510 opposite the side 302, the side 306 connected to the point 510, and the side 308 opposite the side 306. The side 306 forms an angle $\theta_6$ with respect to the central axis 310 of the surface 266, and the side 308 forms an angle $\theta_7$ with respect to the central axis 310 of the surface 266. The angle $\theta_6$ ranges from about 5 degrees to about 30 degrees, and the angle $\theta_7$ ranges from about 5 degrees to about 30 degrees. In one embodiment, the surface 266 is substantially symmetric with respect to the central axis 310, and the angles $\theta_6$ and $\theta_7$ are substantially the same. In another embodiment, the surface 266 is substantially asymmetric with respect to the central axis 310, and the angles $\theta_6$ and $\theta_7$ are substantially different. As shown in FIG. 5C, the surface 266 is substantially symmetric with respect to the central axis 310. The surface 264 of the magnetic layer 244 may have the same shape as the surface 266 and may be substantially parallel to the surface 266.

FIGS. 6A and 6B are schematic illustrations of shapes of a surface 601 of a magnetic layer 600 that lead to increased switching time. As shown in FIG. 6A, the surface 601 of the magnetic layer 600 has a first side 602 at the MFS 212 (FIG. 2A) and a second side 604 opposite the first side 602. The length of the second side 604 is substantially greater than the length of the first side 602. The switching time of the magnetic layer 600 is greater than the switching time of the magnetic layer 244.

As shown in FIG. 6B, the length of the second side 604 of the surface 601 of the magnetic layer 600 is substantially greater than the length of the first side 602 of the surface 601 of the magnetic layer 600. Similarly, the switching time of the magnetic layer 600 is greater than the switching time of the magnetic layer 244.

Figure 7:
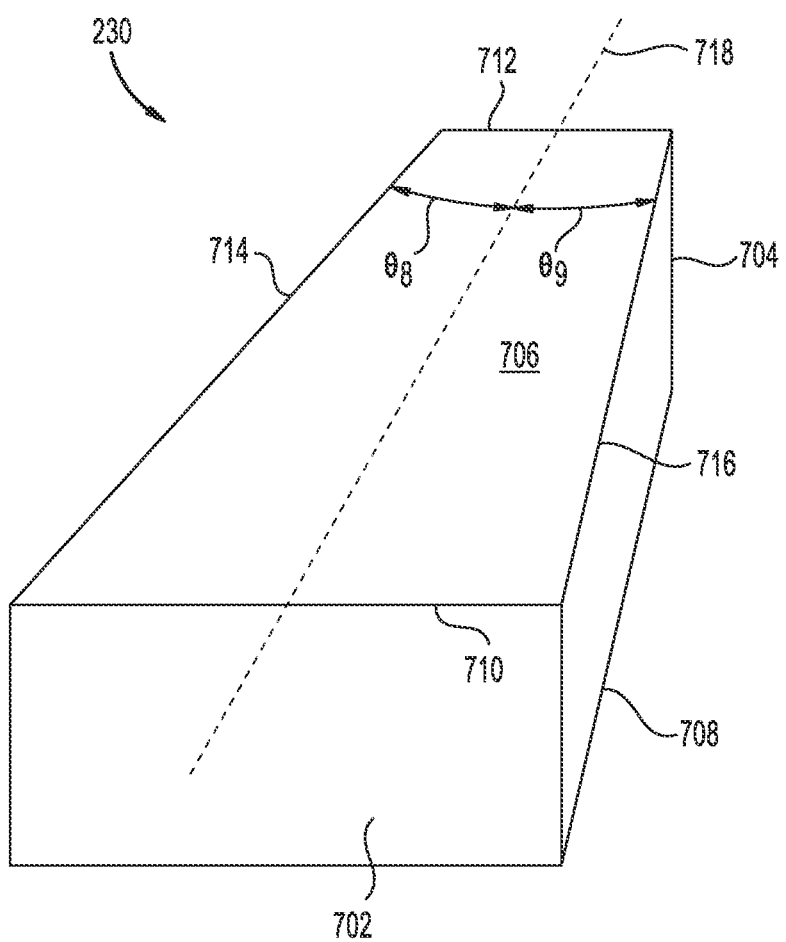
FIG. 7 is a perspective view of a MAMR stack of the write head of FIG. 2A according to one embodiment.

FIG. 7 is a perspective view of the MAMR stack 230 of the write head of FIG. 2A according to one embodiment. In one embodiment, the seed layer 242 and the spacer layer 246 have the same shape as the magnetic layer 244 (FIG. 2B), and the shape of the MAMR stack 230 may be similar to the shape of the magnetic layer 244, as shown in FIG. 7. The MAMR stack 230 includes a first surface 702 at the MFS 212 (FIG. 2A), a second surface 704 opposite the first surface 702, a third surface 706 connecting the first surface 702 and the second surface 704, and a fourth surface 708 opposite the third surface 706. The third surface 706 may face the main pole 220, and the fourth surface 708 may face the trailing shield 240 (FIG. 2A). The area of the surface 704 is substantially less than the area of the surface 702. The surface 706 includes a first side 710 at the MFS 212 (FIG. 2A), a second side 712 opposite the first side 710, a third side 714 connecting the first side 710 and the second side 712, and a fourth side 716 opposite the third side 714. The length of the first side 710 may be substantially the same as the length $L_1$ of the first side 302 (FIG. 3A), and the length of the second side 712 may be substantially the same as the length $L_2$ of the second side 304 (FIG. 3A). The third side 714 of the surface 706 of the MAMR stack 230 forms an angle $\theta_8$ with respect to a central axis 718 of the surface 706. The fourth side 716 of the surface 706 of the MAMR stack 230 forms an angle $\theta_9$ with respect to the central axis 718 of the surface 706. The angle $\theta_8$ may be substantially the same as the angle $\theta_1$, and the angle $\theta_9$ may be substantially the same as the angle $\theta_2$. As shown in FIG. 7, the surface 708 of the MAMR stack 230 may have the same shape as the surface 706 and may be substantially parallel to the surface 706.

By reducing the area of the magnetic layer in a MAMR stack at the location recessed from the MFS, the amount of magnetic material of the magnetic layer to be switched at the location recessed from the MFS is reduced. With the reduced magnetic material, the switching time of the magnetic layer is reduced compared to the switching time of a conventional magnetic layer having a cuboid shape.

While the foregoing is directed to embodiments of the present disclosure, other and further embodiments of the disclosure may be devised without departing from the basic scope thereof, and the scope thereof is determined by the claims that follow.

The invention claimed is:

1. A magnetic recording head, comprising:
   a trailing shield;
   a main pole; and
   a stack disposed between the trailing shield and the main pole at a media facing surface, wherein the stack comprises at least a layer having a surface facing the main pole, wherein the surface has a first side at the media facing surface and a second side opposite the first side, wherein the stack consists essentially of:
   a seed layer contacting the main pole;
   a magnetic layer contacting the seed layer; and a spacer layer contacting the magnetic layer, wherein the spacer layer contacts a notch and wherein the notch comprises a magnetic material, wherein the main pole has:
a first track width at the media facing surface, the first track width being less than a length of the first side of the surface,
a second track width adjacent to the second side of the surface, the second track width being greater than the first track width, and
a third track width that is substantially equal to a length of the surface at a location disposed between the first and second sides of the surface.

2. The magnetic recording head of claim 1, wherein the surface is substantially symmetric with respect to a central axis of the surface.

3. The magnetic recording head of claim 2, wherein the surface further comprises the second side connecting the first side and a third side opposite the second side.

4. The magnetic recording head of claim 3, wherein the second side forms a first angle with respect to the central axis, and the third side forms a second angle with respect to the central axis, wherein the first angle and the second angle each ranges from about five degrees to about 30 degrees.

5. The magnetic recording head of claim 1, wherein the seed layer comprises Ta, Cr, Cu, NiAl, Ru, Rh, or combinations thereof.

6. The magnetic recording head of claim 1, wherein the spacer layer is disposed between the at least a layer and the trailing shield.

7. The magnetic recording head of claim 1, wherein the spacer layer comprises copper or silver tin alloy.

8. The magnetic recording head of claim 1, wherein the trailing shield comprises the notch.

9. The magnetic recording head of claim 1, wherein the at least a layer comprises a magnetic material.

10. The magnetic recording head of claim 9, wherein the magnetic material comprises NiFe, CoMnGe, CoFe, or combinations thereof.

11. The magnetic recording head of claim 1, wherein the at least a layer is a spin torque layer (STL).

12. The magnetic recording head of claim 1, wherein the main pole comprises FeCo or FeCo(N).

13. The magnetic recording head of claim 1, further comprising a leading shield.

14. The magnetic recording head of claim 13, wherein the leading shield comprises FeCo or NiFe alloy.

15. A data storage device comprising the magnetic recording head of claim 1.

* * * * *